Jan. 15, 1924. 1,480,816
G. H. DAVIS
DIRECTION INDICATOR FOR AUTOMOBILES
Filed March 29, 1922 2 Sheets-Sheet 1

INVENTOR
George H. Davis.
BY
Fred J. Dieterich
ATTORNEYS

Jan. 15, 1924.
G. H. DAVIS
1,480,816
DIRECTION INDICATOR FOR AUTOMOBILES
Filed March 29, 1922   2 Sheets-Sheet 2
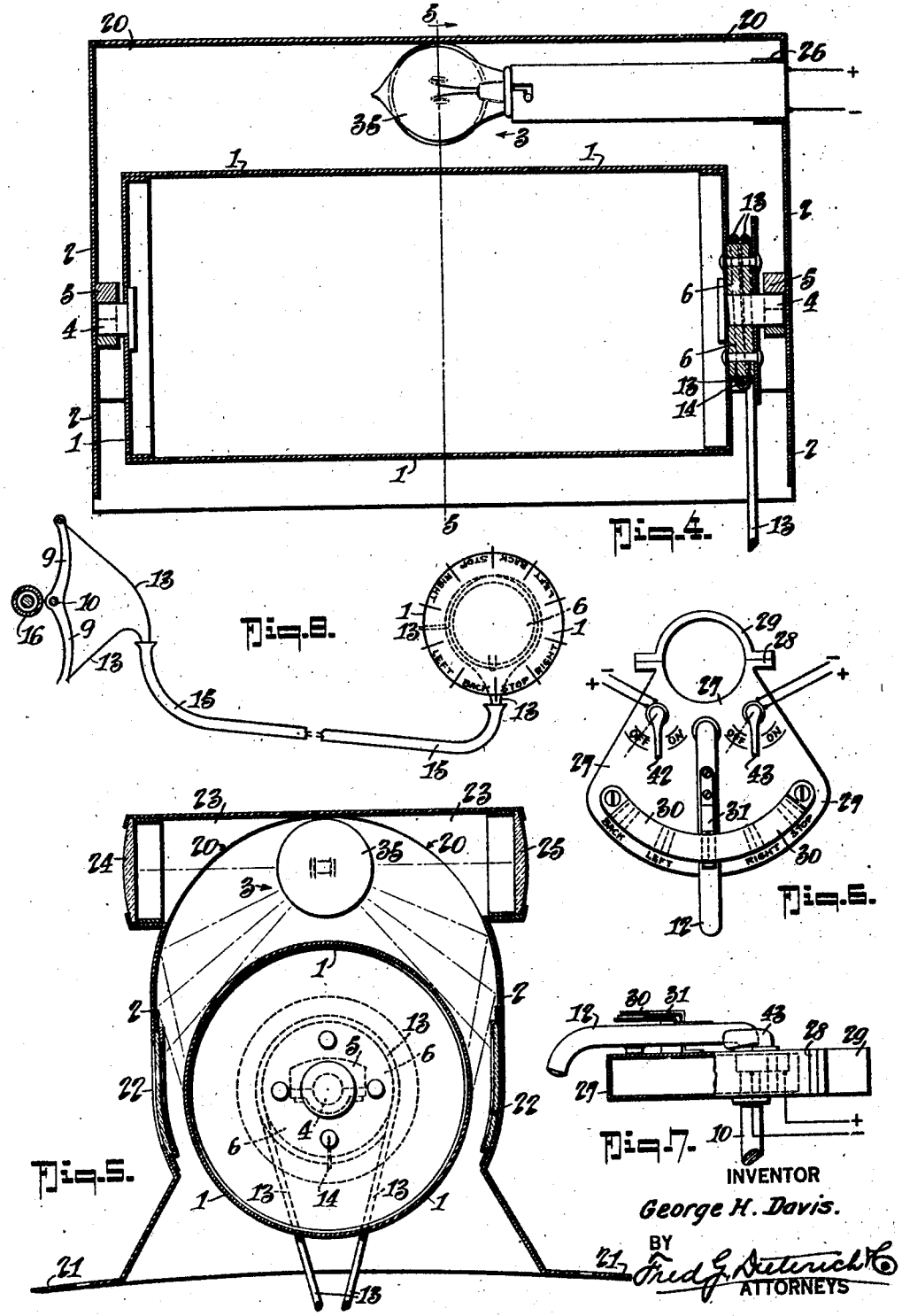
INVENTOR
George H. Davis.
BY
Fred G. Dieterich
ATTORNEYS Patented Jan. 15, 1924.

1,480,816

UNITED STATES PATENT OFFICE.

GEORGE H. DAVIS, OF RICHMOND, VIRGINIA.

DIRECTION INDICATOR FOR AUTOMOBILES.

Application filed March 29, 1922. Serial No. 547,847.

*To all whom it may concern:*

Be it known that I, GEORGE H. DAVIS, a citizen of the United States, residing at Richmond, in the county of Henrico and State of Virginia, have invented certain new and useful Improvements in Direction Indicators for Automobiles, of which the following is a specification.

This invention has reference to improvements in direction indicating and signalling mechanisms for automotive vehicles especially designed for being controlled by the operator of the vehicle and adapted for visibly indicating, to a following vehicle or pedestrian at the side of the road, the direction of movement taken by the machine ahead.

Primarily, my invention seeks to provide an improved direction and signalling means, of the general character stated, that is simple, reliable and effective in use, that can be economically applied to a motor vehicle, and in which the means for shifting the indicating elements and for putting into operation the signalling devices carried on the car can be conveniently and quickly adjusted for bringing the said directing or indicating elements into operative condition.

With the above mentioned objects, and other objects in view that will hereinafter be stated, my invention embodies, in a direction indicating and signalling mechanism of the kind stated, the peculiar features of construction and novel combination of parts, fully explained in the following detailed description, specifically set out in the appended claims and illustrated in the accompanying drawings, in Figure 1 is a diagrammatic side elevation of an automobile with my improvements indicated as in operative position thereon.

Figure 4 is a longitudinal section of the indicator drum or cylinder, the casing in which it is revolubly mounted, the connection for the pull cable that imparts rotation to the drum being also shown.

Figure 5 is a transverse section taken substantially on the line 5—5 on Figure 4 looking in the direction of the arrow.

Figure 6 is a plan view of the indicator mechanism.

Figure 7 is a detail elevation thereof, parts being in section.

Figure 8 is a diagrammatic view that illustrates the relation of the cylinder revolving arms and the indicating cylinder.

Figure 1:
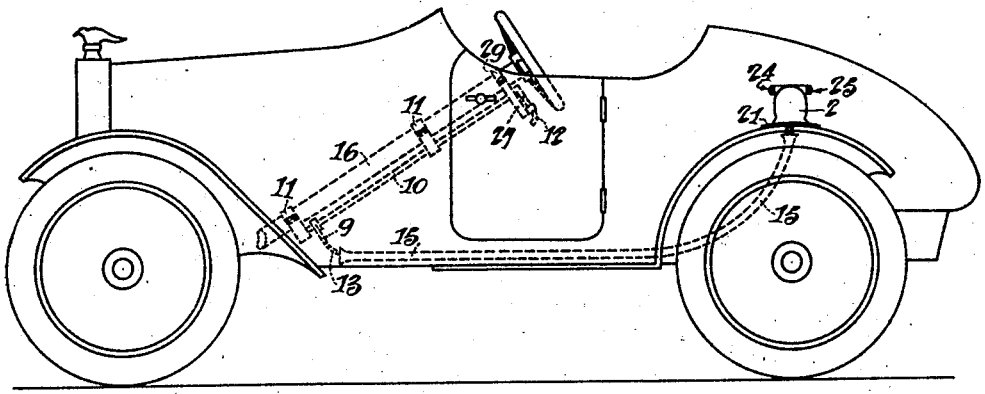

In the drawings I have illustrated so much of an automotive vehicle as is necessary to illustrate a practical application of my invention, the same being disclosed in the form in which its application will be apparent, it being also understood that the invention is not limited to the exact arrangement or form shown since the precise manner in which the parts, which constitute the invention, are practically applied will be governed by the particular type or make of the vehicle with which my invention is to be used.

As shown in the accompanying drawings, the indicator mechanism, per se, is located on the left side rear wheel fender of the vehicle and the said mechanism includes a cylindrical drum 1 which is preferably formed of sheet metal, as indicated in Figures 4 and 5 and upon the outer face of which is painted or otherwise delineated the lettering of the various signals such as are usually mounted on automobiles.

As shown in the drawings, my construction of direction signalling means comprises a housing 2, preferably sheet metal, that includes a semi-cylindrical crown portion 20, front and back walls and opposite end walls, the bottom edge of the several walls being suitably shaped to snugly seat upon the mud guard or other member of the vehicle rigging and the said back and front walls have longitudinal bottom flanges 21—21 suitably apertured to provide for readily attaching the housing to the mud guard of the vehicle, as will be clearly understood by reference to Figure 1 of the drawings.

Figure 2:
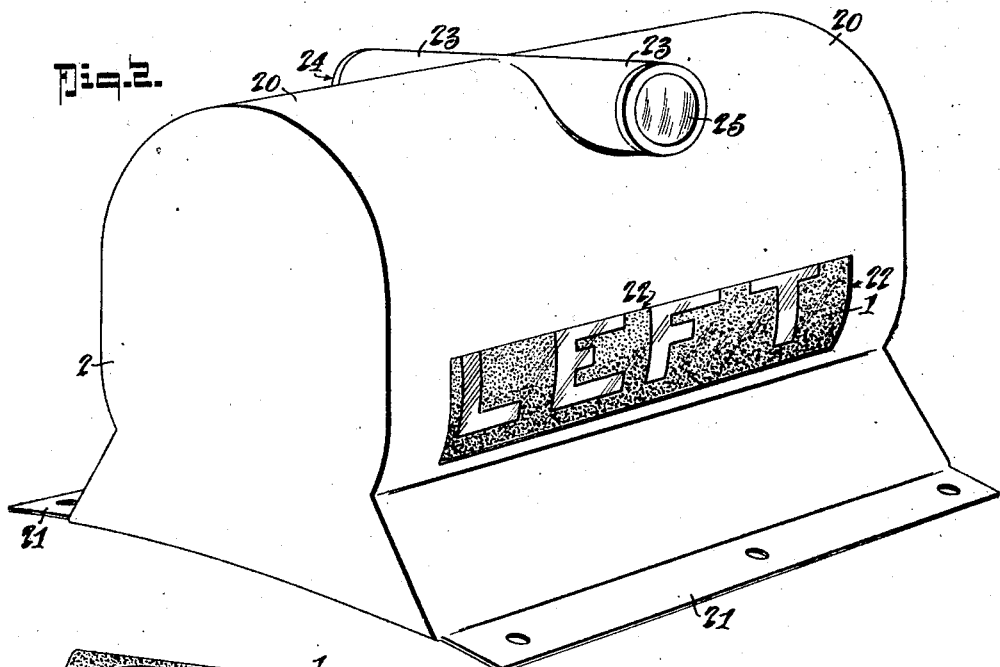
Figure 2 is a perspective view of the drum casing or housing, a portion of the direction indicator drum and the clear and red directing light lenses, being indicated in this figure.
Figure 3:
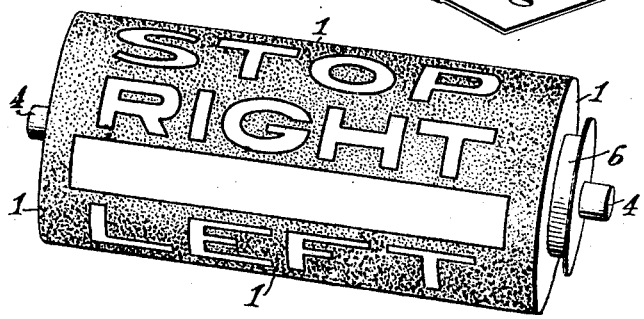
Figure 3 is a perspective view of the direction indicator cylinder or drum separated from the casing.

Within the housing is rotatably mounted a signalling drum or cylinder 1 whose axis is in transverse alignment with the oppositely disposed windows or sight openings 22 in the front and back walls of the housing, as is best shown in Figure 5, by reference to which and to Figure 2 it will be noticed the said crown portion 20, midway its length, is formed with oppositely disposed lateral tubular extensions 23—23 in which are located the forward or clear parking lens 24 and the back or red parking lens 25, presently referred to.

The sign carrying drum, in my construction of direction indicating means, is divided into two sets of annularly disposed signalling signs or words, and each set of signs includes a centrally disposed blank indicator, hereinafter referred to as the central or normal indicator, since the blank sign sections appear to view when the control lever, hereinafter described, is at the central or dead position.

The two sets of indicator signs, which are painted or otherwise applied in longitudinally extended parallel lines, on the periphery of the drum 1, are arranged alike and they each include "Right," "Stop," "Back" and "Left" designations, with the designations of one set that extend around the drum from the central or blank space in one direction, disposed reversely to the like diametrically oppositely disposed sign designations, that extend in reverse direction from the blank space at the opposite side of the drum, or in other words, the two sets of designations are relatively so disposed, with relation to each other and the sight openings in the drum, that should the designation "Left" be brought around in visual position, the said word at opposite sides will simultaneously appear, through the respective sight openings 22 in the front and back walls of the housing.

3 designates an illuminant, (an electric light being shown) whose casing is supported in a socket 26 in one end of the housing, and as shown, the bulb 35 of the illuminant is located midway the length of the housing, in transverse alignment with the opposite parking lenses 24—25 and directly above the vertical axis of the drum 2.

Locating the single light bulb in the housing in the manner stated enables that bulb not only to project the light rays through the two opposite lenses 24—25, at the upper part or crown of the housing, but also enables the light rays to be projected down against the outside surface of the upper half of the drum or cylinder and the selected sign areas, at the housing sign openings 22, the inside surfaces of the front and back walls of the housing acting as light reflectors, as indicated by the dot and dash lines on Figure 5.

The drum 1, as before stated, is rotatably mounted with the housing 2 and in the present showing of my invention, a stub axle or spindle 4 is attached to and projected from each drum head or end, and the said spindles 4, when the drum is operatively fitted within the said housing, are journalled in bearings 5 attached, in any suitable manner, to the opposing end faces of the housing.

In order to impart the desired rotative movements to the indicator drum to bring the desired signal signs into view, through the opposite openings 22 in the opposite front and back ends of the housing, a single flexible cable 13, is wound (one and a half times) around a drum disk 6 and the coil of the said cable made fast to the disk 6 by a staple 14 or other suitable means, as clearly indicated in Figures 5, 6 and 8.

As is diagrammatically illustrated in Figure 8, the free ends of the cable 13 pass into a tubular guide 15 that is suitably mounted along the vehicle body and in such manner that the terminals of the said cable pass up for being conveniently connected with the oppositely projecting ends of a rocking lever 9 that is fixedly attached to the lower end of a controlling rod 10 that extends along the vehicle steering post 16, the latter having brackets 11—11 in which the said rod 10 is rockably sustained as is clearly indicated in Figure 1. The upper end of the rod 10 terminates in a right angled member which constitutes the controlling lever 12 for effecting the rotation of the indicator drum in the manner hereinafter explained.

Cooperative with the lever 12 is a segment shaped casing 27 the inner end of which has a concaved seat and lateral members 28 whose purpose is to engage like members of a semi-circular clamp band 29 for securing the casing 27 to the post 16, see Figure 1.

The control lever 12 referred to is laterally swingable, in either direction, over the top face of the casing 27 and under a segmental shaped bracket 30, and the said lever has a spring detent 31 for engaging either of a set of ratchet teeth on the under face of the bracket 30, the arrangement of which is clearly indicated in Figure 6 from which it will be observed a centrally disposed ratchet tooth 32 serves to hold the lever 12 to the central or blank positions, that is when the lever 12 is positioned as in Figure 6 the indicator devices will show the "blank" spaces at opposite ends of the housing 2.

On the top face of the casing 27, along the front edge of the bracket 30, is indicated the five positions to which the control lever 12 is adjusted to effect the desired rotations of the indicator drum 1 to bring the selected sign to indicate the direction the vehicle is to take, the "Left" and "Back" designations being located at the left side of the central or blank position and the "Right" and "Stop" position being located to the right of the said central or blank position as shown, it being understood that the bracket 30 has ratchet teeth in line with each of the said positions with which the detent 31 engages when the said lever 12 is shifted laterally as conditions of vehicle travel may require.

By reason of the peculiar arrangement of the indicator drum or cylinder, with its two diagrammatically opposite sets of indicator signs, and the manner in which the master switch or control lever devices are combined therewith, a positive shifting of the direction signs is provided for, set in action, as it were, by a two-way cable system with uniform strain on the actuating cable, at all times, and without having to resist a continuous strain of a resilient spring common in indicator mechanisms now provided and in which the direction indicating elements are operable by driver-controlled means.

In my construction of direction indicator mechanism, the control is a single unit device set at the will of the driver by use of his right hand, the one that is least used when operating the wheel.

For controlling the lamp 3 the electric circuit is in connection with a switch lever 42 mounted on the casing 27, at the left of the control lever 12 and the said switch, in practice, is so arranged that when at the full line position, shown in Figure 6, the battery energy through the circuit to the lamp is "on" and when shifted to the position indicated by the dash line on the said Figure 6, the said energy to the light is "off."

A similarly arranged switch 43 is mounted on the casing 27 and located at the right of the control lever 10 for turning the electric energy for sounding the horn "on" or "off", as the conditions may make necessary.

While in this application I have shown and described a particular construction of operating switch device (see Figures 6 and 7) I make no claim, per se, thereto, or to the same in combination broadly with the light, horn and direction indicator controlled thereby, as that forms the subject matter of a divisional application Serial #645384 filed on the 14th day of June, 1923.

From the foregoing description, taken in connection with the drawings, the complete construction, the manner of its operation and the advantages of my invention will be readily apparent to those familiar with the manufacture and use of automotive vehicles.

What I claim is:

1. In a signalling device, a housing adapted for mounting on an automobile, said housing having front and back and end walls and a crown portion, a signal carrying drum mounted in the housing below the crown portion, said drum having sight openings in its front and back walls to expose opposite signals on the drum, an illuminant in the crown portion of the housing adapted, in combination with the inner surfaces of the crown and front and back wall portions of the housing adjacent thereto, to illuminate the signals on the drum opposite the sight openings, and means for operating the drum.

2. In a signalling device, a housing adapted for mounting on an automobile, said housing having front and back and end walls and a crown portion, a signal carrying drum mounted in the housing below the crown portion, said drum having sight openings in its front and back walls to expose opposite signals on the drum, an illuminant in the crown portion of the housing adapted, in combination with the inner surfaces of the crown and front and back wall portions of the housing adjacent thereto, to illuminate the signals on the drum opposite the sight openings, and front and back parking lenses carried by the crown portion of the housing and illuminated by the said illuminant.

3. In a signalling device, a housing adapted for mounting on an automobile, said housing having front and back and end walls, and a semi-cylindrical crown portion, a signal carrying drum mounted in the housing below in the crown portion, the said drum having a sight opening to expose signals on the drum, an illuminant in the crown portion of the housing adapted, in combination with the inner surfaces of the crown and front and back walls of the housing adjacent thereto, to illuminate the signals on the drum in front of the sight opening and means for operating the drum.

4. A direction indicating mechanism for auto vehicles comprising a housing mountable upon the vehicle body and having a sight opening in each of the opposite end walls thereof, a drum rotatably mounted within the casing with its axis in transverse alignment with the opposite sight openings, said drum having two sets of signals thereon, the signals of one set being disposed diametrically opposite the signals of the other set, a single flexible cable coiled about the drum shaft and connected therewith whereby the drum is rotated in opposite directions by alternately pulling the ends of said flexible cable to bring the selected ones of the opposite signs on the drum to register with their respective sight openings in the sides of the housing, and means operable by the driver of the vehicle for manipulating the flexible cable.

GEORGE H. DAVIS.